United States Patent [19]

Smith, Jr. et al.

[11] 4,119,580

[45] Oct. 10, 1978

[54] METHOD FOR FORMING AGGLOMERATED ION EXCHANGE RESIN

[75] Inventors: Frank C. Smith, Jr., Felton; Richard C. Chang, Santa Clara, both of Calif.

[73] Assignee: Dionex Corporation, Sunnyvale, Calif.

[21] Appl. No.: 848,785

[22] Filed: Nov. 7, 1977

[51] Int. Cl.$^2$ .................... C08F 220/34; B01D 15/08
[52] U.S. Cl. .................................................... 521/28
[58] Field of Search ..................... 260/2.1 M, 2.1 R

[56] References Cited

FOREIGN PATENT DOCUMENTS 2,446,375  2/1973  Fed. Rep. of Germany ....... 260/2.1 M
1,407,116  9/1975  United Kingdom ................. 260/2.1 M

*Primary Examiner*—Joseph L. Schofer
*Assistant Examiner*—Peter F. Kulkosky

*Attorney, Agent, or Firm*—Flehr, Hohbach, Test, Albritton & Herbert

[57] ABSTRACT

A method for forming agglomerated ion exchange particles in which finely divided synthetic resin coating particles are affixed to the surface of synthetic resin substrate particles. The surface of the coating particles have ion exchange sites with monovalent counterions (e.g., negatively charged) which are attracted to the ion exchange sites on the substrate particles. Multivalent ions (e.g., carbonate) of the same charge as such monovalent counterions are mixed into an aqueous disperson of the coating particles to displace the monovalent counterions thereby increasing the electrostatic charge density of the coating particles. Then, a slurry of the synthetic resin substrate particles is added dropwise to this dispersion which is mixed to form agglomerates by electrostatic attraction.

10 Claims, 3 Drawing Figures

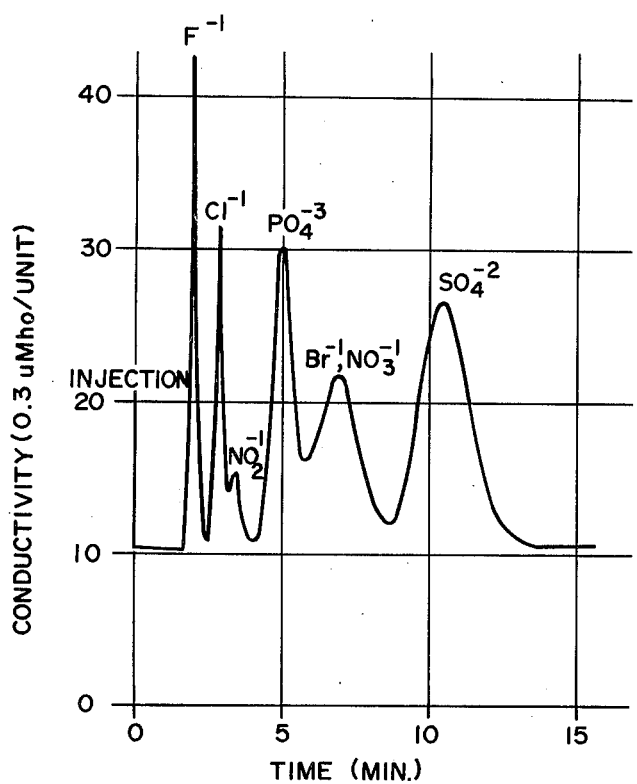
FIG.—1
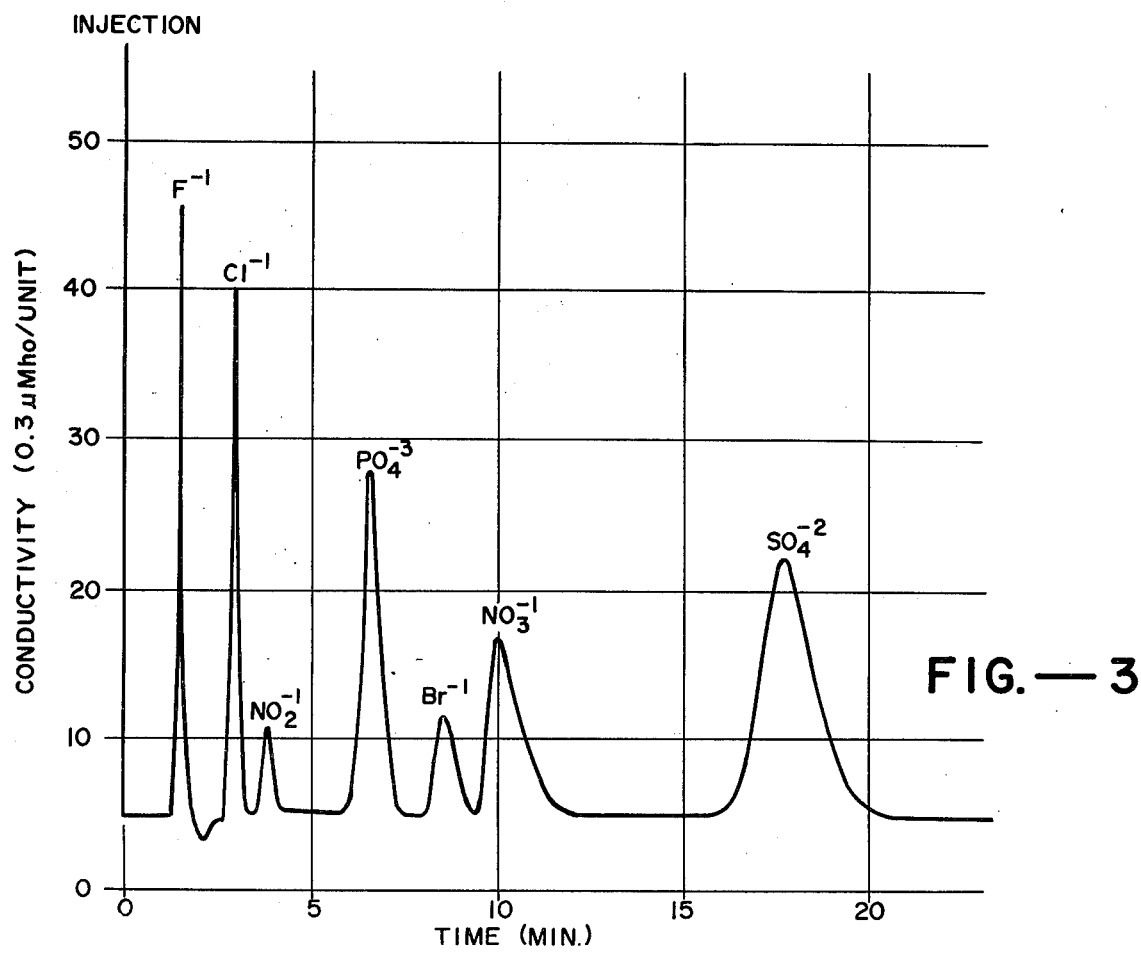
FIG.—3

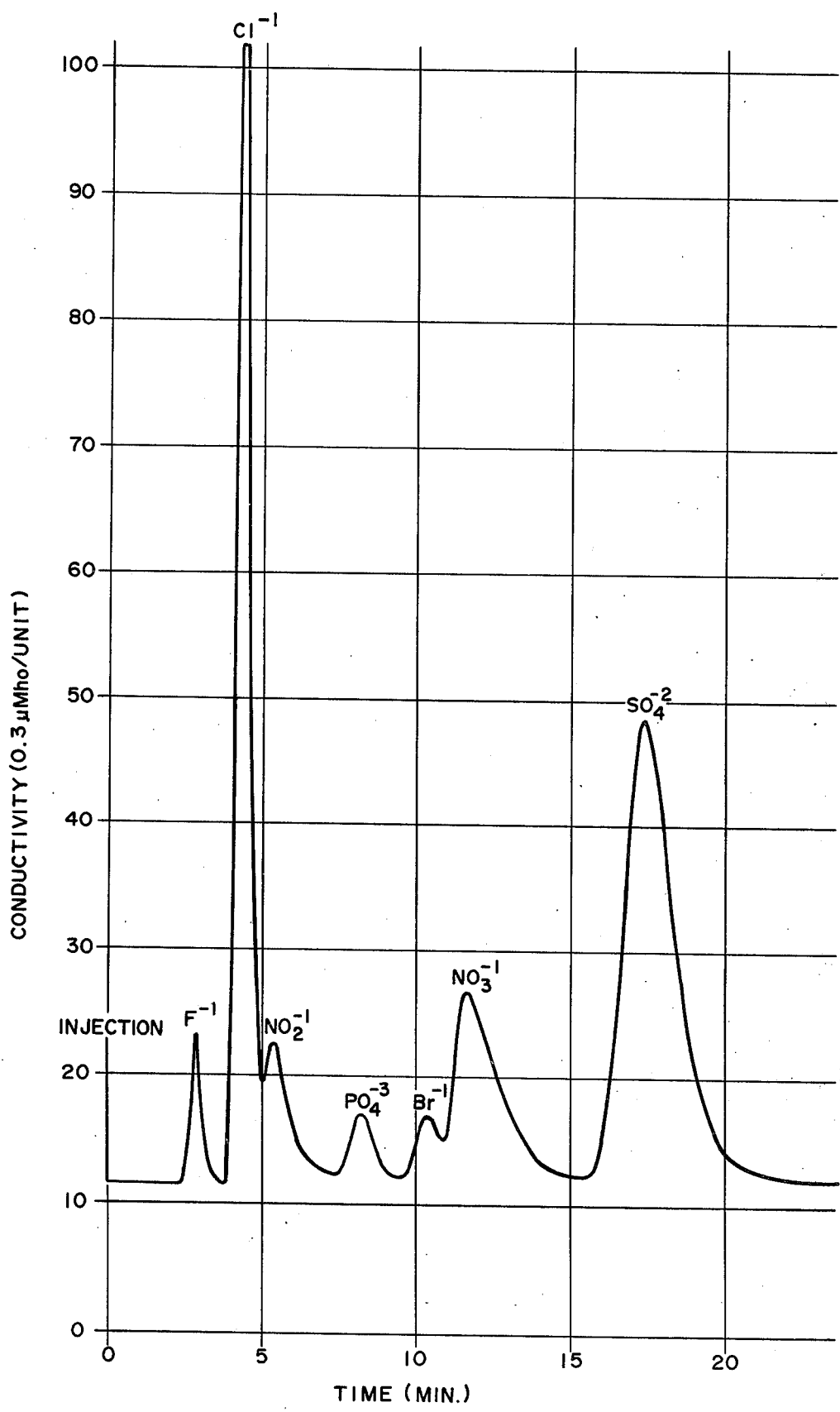
FIG.—2

METHOD FOR FORMING AGGLOMERATED ION EXCHANGE RESIN

BACKGROUND OF THE INVENTION

Ion exchange agglomerates have been prepared in which insoluble substrate particles of synthetic resin having ion exchange sites on their surface are coated with insoluble synthetic resin coating particles having ion exchange sites which attract the sites of the substrate and irreversably attach to the substrate. Such compositions are used for removal and separation of ions, particularly inorganic anions, and are especially useful in liquid ion exchange chromatography. In a specific example, the ion exchange composition includes surface sulfonated resin beads of styrene-divinylbenzene copolymer and a monolayer of quaternary ammonium styrene-divinylbenzene copolymer resin coating particles in the hydroxy form attached to the surface of the beads. A chromatographic separation of anions may be effected in a bed of such particles by elution with an aqueous sodium hydroxide solution.

A technique which has been employed to form the aforementioned agglomerates is as follows. A liquid suspension of the relatively large beads in a nonsolvent slurry is deposited in an ion exchange column. Then, a dispersion of the coating particles is passed through the column. Completion of formation of the monolayer is indicated by breakthrough of the coating particles in the column effluent stream. In this in situ process, the column is then employed in that form for liquid chromatography.

There are a number of disadvantages to the above process. As the columns are formed in situ, it is apparent that those areas where the resin beads contact each other are blocked from exposure to the coating particles. This leads to bald spots on the agglomerated resin beads. Any rotation of the agglomerate resin beads leads to a loss of liquid chromatography capacity and consequent loss of resolution. This is illustrated by very poor separation between bromide and nitrate ions and relatively poor separation between nitrite ions and chloride ions. In addition, it has been found that acceptable columns for use in this type of separation can only be formed in about 25 to 30% of the columns packed. Furthermore, a portion of the more expensive coating particles is lost as breakthrough from the column is the indicator used for completion of the reaction. Finally, a common form of the active sites of a coating particles is the carbonate form. For use in this process, the column must be equilibrated with carbonate, e.g., sodium bicarbonate or sodium carbonate, an additional step.

SUMMARY OF THE INVENTION AND OBJECTS

Agglomerated ion exchange particles are formed by mixing multivalent ions into an aqueous dispersion of finely divided coating particles formed of insoluble synthetic resin on their surfaces having ion exchange sites with monovalent counterions. The multivalent ions are of the same charge as the monovalent counterions and displace them to increase the charge density on the sites. Thereafter, a stream of synthetic resin substrate particles having ion exchange sites which attract the coating particle ion exchange sites are directed into a volume of such aqueous dispersion. In this manner, agglomerates are formed of independent substrate particles with uniform layers of coating particles affixed to their surfaces. Carbonate is a preferred multivalent ion as the same ion can be used as the counterion for subsequent chromatographic separations. During mixing, the substrate particles are agitated to coat the entire surface with the active coating particles and to prevent formation of masses of agglomerates of resin beads. Then, the agglomerate slurry may be passed into an ion exchange separation column and packed as a bed therein.

It is an object of the present invention to provide a method for forming agglomerated ion exchange particles formed of synthetic resin substrate particles fully covered with coating particles containing active ion exchange sites.

It is a further object of the invention to provide a method for forming agglomerates of the foregoing type characterized by repeatable capacity and high resolution in ion exchange chromatography.

It is another object of the invention to provide a method for forming agglomerated resin of the foregoing type in which the yield of acceptable columns is significantly greater than that of the prior art and which is capable of operating at lower pressures than that of the prior art.

It is another object of the invention to provide a method for forming agglomerated ion exchange particles external to an ion exchange column for subsequent filling of large or small columns.

Further objects and features of the invention will be apparent from the following description taken in conjunction with accompanying drawings.

BRIEF DESCRIPTION OF THE DRAWINGS

FIG. 1 is a chromatogram performed on a standard of seven anions using a column of agglomerated resin formed according to the present method but without the addition of multivalent ions prior to agglomeration.

FIG. 2 is a chromatogram of the anions of FIG. 1 using a column of resin formed by agglomeration in the column itself as performed in the prior art.

FIG. 3 is a chromatogram of the anions of FIG. 1 using the agglomerated ion exchange resin formed in accordance with the present method using carbonate as the multivalent ion.

DETAILED DESCRIPTION OF THE PREFERRED EMBODIMENTS

According to the present invention, substrate particles, typically resin beads, serve to firmly retain coating particles which include active ion exchange sites used for chromatographic separation. Such substrate particles comprise synthetic resin insoluble in the solvent systems used for separation. They are suitably formed of finely divided particles, preferably substantially spherical in shape of about 5 to about 100 microns particle size, most preferably about 35 to about 75 microns.

The synthetic resin substrate particles have monovalent ion exchange sites on their surfaces. Such resins include polyvinylaromatic, polyacrylic, polymethacrylic, polyphenol-formaldehyde resins which are suitably cross-linked to render them insoluble in any solvent media to which they will be contacted, and which have desired ion exchange sites. The synthetic resins may be in a macroporous or gel form as commonly employed.

The ion exchange sites on the substrate particles are located on the exposed surface of the particles which come in contact with the coating particles. Thus, when employing beads of a gel-type resin, such surface is essentially the external bead surface. On the other hand, a substrate is formed of a macroporous resin, the surface includes the outer surface as well as the inner surface of the channels which permeate the structure and which have pore sizes greater than the particle size of the coating particles.

In a preferred embodiment of the invention, the resin substrate particles comprise about 400 to 200 mesh (about 35–75 microns) beads of cross-linked polyvinylaromatic resin, most preferably a styrene-divinylbenzene copolymer containing about 2 to about 8% divinylbenzene monomer by weight, of the gel-type which have anion or cation exchange sites on the surface.

The agglomerates of the present invention including particles comprising finely divided synthetic resin particles from about 0.1 to about 5 microns and preferably from about 0.375 to 0.70 micron median diameter which are irreversably attached to the surface of the substrate particles forming a uniform monolayer thereon. Such particles have ion exchange sites which attract counterion exchange sites of the substrate. (Median diameter relates to the statistical distribution of total particle volume with respect to varying particle size.) These particles are also insoluble in the solvents with which they are contacted.

Similar resins may be employed for the coating particles as for the substrate particles. Thus, such coating particles may be derived from synthetic polymeric ion exchange resins as set forth above and may be of a gel or macroporous resin type. Polyvinylaromatic and preferably cross-linked styrene-divinylbenzene copolymer may be used having ion exchange sites substantially throughout a majority of the particles. Such sites may be anion or cation exchanging sites and are counter to the ion exchange sites on the substrate particles. Thus, where the substrate sites are anion exchanging sites, the sites of the coating particles are cation exchanging sites and visa versa. The term "ion exchange sites" is meant to include chelating sites which are attracted to or form coordination complexes with the ion exchanging sites of the other component. For example, aminocarboxylic acid groups are such chelating sites. The preparation of such chelating sites is well known in the art, e.g., as described by Morris, U.S. Pat. No. 2,875,162 and Mock et al U.S. Pat. No. 2,190,445. One such chelating resin which is commercially available is Dowex A-1 chelating resin.

In accordance with the present method, a slurry of the synthetic resin substrate particles is passed dropwise into a volume of the coating particles to form agglomerates comprising a uniform layer of the coating particles affixed to the surface of the substrate particles. At the indicated particle sizes, the coating particles are generally in a latex form with a cloudy appearance. The end point at which essentially all of the coating particles are depleted from the mixing vessel is determined when the liquid turns from a cloudy color to a clear color. This is a sharp cut-off point and so there is little waste of the relatively expensive coating particles.

The above general formation technique employing monovalent ion exchange sites on the surface of the coating particles has been found to provide inadequate resolution of mixed ions in a chromatographic separation. For example, agglomerates formed by coating surface sulfonated cation exchange substrate particles with coating particles containing quaternary ammonium salt particles with monovalent counterion (e.g., chloride) do not provide adequate resolution of a standard ion mixture containing the following ions — fluoride, chloride, nitrite, phosphate, bromide, nitrate, and sulfate. This is illustrated in FIG. 1 in which the resolution between chloride and nitrite, between bromide and nitrate, and between nitrate and sulfate is clearly inadequate. The technique for forming the agglomerates is the same as that set forth in Example 1, except for the addition of carbonate ion, and the chromatographic separation technique is the same as set forth in Example 2.

The above results may be the reason why the prior art has suggested the cumbersome and inflexible technique of agglomerate formation directly in the separation column by first packing the column with substrate particles and then passing the coating particles through the column. This in situ technique provides a somewhat better resolution than the technique of FIG. 1 but still provides inadequate resolution between the ions, particularly between the chloride and nitrite ions and between the bromide and nitrate ions as illustrated in FIG. 2. The chromatographic separation technique is set forth in Example 2.

Applicants discovered that a more convenient technique of FIG. 1 could be modified to provide vastly improved resolution and capacity control not only compared to the use of the agglomerates used in FIG. 1 but also compared to the agglomerates formed by the less convenient and more expensive in situ process of FIG. 2. This is clearly illustrated in the chromatogram of FIG. 3 using the agglomerates formed by Example 1 and the chromatographic method set forth in Example 2. As is illustrated in FIG. 3, anions of the standards of FIGS. 1 and 2 are fully separated at high resolution showing that the agglomerates of the present invention are of significantly better resolution than the agglomerates of the prior art.

Applicants' discovered technique comprises mixing soluble multivalent ions, of the same charge as the counterions on the coating particle ion exchange sites, into the coating particle aqueous dispersion and thereafter directing a stream of the substrate particles through this mixture. This forms independent agglomerates of coated substrate particles of superior resolution at a given capacity. Assuming an anion exchange chromatographic ion exchange resin in which the coating particles are in anionic form, e.g., chloride, the multivalent ions include carbonate ion, phosphate ion, or mixtures of the same. Carbonate ion is preferable where the eluent is of a carbonate and/or bicarbonate type as this avoids subsequent equilibration in carbonate ion. That is, in the prior art technique, after formation of the agglomerates, use of a carbonate and/or bicarbonate buffer would require subsequent equilibration to displace the monovalent chloride anion.

Referring again to the process of agglomerate formation, soluble multivalent ions are thoroughly dispersed in an aqueous dispersion of the finely divided coating particles. For simplicity of description, the coating particles comprise styrene-divinylbenzene particles with ion exchange sites comprising quaternary ammonium chloride. In this instance, the multivalent ion comprises carbonate, of the same charge as the chloride counterion on the coating particle ion exchange sites. A preferred form of the soluble carbonate is sodium carbonate which retains a slightly basic pH level to the solution. Carbonic acid could also be employed but this lowers the pH level requiring pH adjustment from that desired for subsequent chromatographic separation.

Particularly effective coating particles are in the size range of 0.375 to 0.70 microns median diameter which when in an aqueous dispersion forms a cloudy latex. A suitable solids content of such particles in the latex dispersion contains the minimum solids content on the order of 5 to 20% by weight. At solids content below this level, it is more difficult to fully coat the substrate particles and so total capacity is reduced with consequent reduction in resolution.

A suitable ratio of carbonate ion to coating particles is at least 1 part carbonate to 10 to 50 parts of coating particles. Thus, based on a 10 ml latex at a 12% solids content, 0.15-1.20 grams of sodium carbonate provides an excellent increase in capacity of the agglomerate rated resin and consequently increases its chromatographic resolution capacity.

Prior to addition to the coating particle latex-multivalent mixture, the substrate particles are preferably slurried at a solids content of, say, 20%. For use with the foregoing quaternary ammonium chloride active site coating particle, a suitable substrate comprises a sulfonated cation-exchange resin.

The substrate particle slurry is suitably added to the coating particle latex-carbonate mixture by dropwise addition of the substrate particles under agitation. The slurry is added until the latex forms a clear liquid. This indicates the end point of coating all of the surface of the substrate particles with the coating particles. Agitation is continued subsequent to termination of addition. It is essential to the method that the substrate be added to a volume of coating particles rather than in the reverse order.

It has been found that agglomerated resin of high capacity is formed employing a ratio of about 3 ml of coating particle latex for each gram of substrate particle where the solids content of the latex is on the order of 12% by weight. This ratio is a function of a full coating of the substrate particles and so may vary depending upon absolute and relative sizes of the coating and substrate particles. The exact ratio is determined on a trial and error basis as the end point is observable by a clearing of the solution.

Another parameter of the process is that the capacity of the resin may be reduced when the total quantities of materials in the same proportions are scaled up beyond a certain volume. Thus, while 10 ml of coating particle latex forms agglomerated resin of high capacity, 20 ml of the same resin in the same proportion may have a somewhat reduced capacity. Thus, if for some speciality application, a very large ion exchange column is to be filled with high capacity resin, it may be desirable to employ two or more batches of resin prepared as above.

After addition of the substrate particles to completion, it is preferable to continue agitation and thereby ensure that the entire surface area of the substrate particles are repeatedly exposed to the coating particles to thereby greatly increase the statistical probabilities of complete coating of the surfaces with a monolayer of the coating particles. Also, this assists in maintaining the agglomerates in independent unclumped form.

After stirring, the agglomerated particles are permitted to settle to the bottom of the reaction vessel. At this time, an aqueous layer free of agglomerates forms above the settled particles. This supernatant layer is removed as by a suction pipette. The settled particles in concentrated form are then packed into the ion exchange separation column in slurry form. A suitable technique for packing the column is to load a flexible loop with the slurry and apply pressure as with a constant volume pump to one end of the loop. This pressure loading provides a uniform packing of high capacity.

It has been found that the yield of good high capacity columns from the foregoing procedure is approximately 90% or more in comparison to yields of approximately 25 to 30% by the prior art techniques. It is believed that this is partially caused by bald spots created in the prior art technique since coating is formed in situ with the coating particles passing through the column rather than agitating the substrates by exposing continually different surfaces to the coating particles. Also, in the present process, the substrate particles are exposed to a large excess of coating particles throughout the coating process until the end point. This is to be contrasted with the prior art in situ process in which substrate particles are in excess until the end point leading to less efficient coating. In addition, the prior art did not employ multivalent ions.

In the ion exchange agglomerates of the present invention, the coating particles and substrates may comprise any combination of two oppositely charged ion exchange resins. Suitable combinations include strong acid-strong base resins; strong acid-weak base resins; strong base-weak acid resins; and strong base-chelating resins. A preferred combination includes substrate particles comprising a strong acid resin and coating particles comprising a strong or weak base resin. The preferred combination includes a surface sulfonated polyvinyl aromatic gel-type substrate resin and a strong base (e.g., quaternary ammonium chloride) polyvinylaromatic resin having ion exchange sites including multivalent counterions.

The theory under which the multivalent ion increases capacity and resolution of the agglomerates of the present invention is as follows. The multivalent ions displace the monovalent counterions on the ion exchange sites of the coating particles. This increases the charge density on such sites thereby increasing the electrostatic attraction of such sites of the coating particles to those of the substrate particles. This facilitates full coating of the substrate particles. Phosphate ions having a charge of minus three would be more effective than carbonate ions of a charge of minus two. The latter ions are preferred for use in a chromatographic separation employing sodium carbonate and/or bicarbonate eluent as this eliminates an equilibration step.

The ion exchange agglomerates of the present invention are employed to remove ions of the same charge from solution by contact of the solution with the agglomerates which attract the ions for removal from solution. Removal may be accomplished by passing the solution through a bed of the agglomerates. Alternatively, the ion exchange composition may be slurried with the solution and then physically separated. Regeneration of the ion exchange composition may be performed by contact with a suitable ion exchange regenerates known in the art.

In a chromatographic separation, the mixture materials to be separated is passed through a separation zone such as a column where the passage of materials is differentially impeded by differences in attraction to chromatographically active sites. This provides separation and resolution. Ion exchange chromatography performs this function by contacting ion exchange sites on a substrate capable of exchanging ions with one or more ions in a mixture. This results in the separation of ions of different chemical types to the different degrees of attraction exhibited by the ion exchange sites for the different type of ions. To remove such ions, an eluent also attracted by the ion exchange site is passed through the column to drive the ions through the columns so that they may be collected or analyzed.

The ion exchange composition of the subject agglomerates has high capacity for providing a high degree of resolution for separation of the ions passing through the column. Generally described, the chromatographic separation includes first passing a mixture containing the ions to be separated through a column of the agglomerates having ion exchange sites that attract one or more of the ions in the mixture. Then, the bed is eluted with an eluent which differentially removes the attracted ions from the bed.

Conventional eluents may be used in the chromatographic separation depending upon the nature of the ions to be separated. Suitable eluents include strong inorganic acids and bases for example, solutions of hydrochloric acid, sulfuric acid, phosphoric acid, sodium hydroxide, potassium hydroxide and the like. Solutions of strongly dissociated organic compounds may also be employed for example, alkoxides, carboxylic acid salts, and the like. A preferred eluent for separating anions comprises alkali metal (e.g., sodium) carbonate and/or bicarbonate. This provides repeatable separations with stable eluents of long shelf life. In comparison, sodium hydroxide tends to absorb carbon dioxide during long term storage rendering chromatographic separations less repeatable.

A further disclosure of the nature of the present invention is provided by the following specific examples of the practice of the invention. It should be understood that the data disclosed serve only as examples and are not intended to limit the scope of the invention.

EXAMPLE 1

This example will describe formation of the agglomerates of the present invention.

The substrate particles are formed as follows. Styrene-DVB (divinylbenzene) resin beads prepared by copolymerizing styrene-DVB copolymer containing about 2-16 weight % DVB monomer is sulfonated by the method described by Small in *Jour. Inorg. Nucl. Chem.*, 18:232 (1961). The copolymer is heated with an excess of concentrated sulfuric acid at about 100° C. for about 1 minute to yield a resin bead with a thin surface shell of sulfonic acid groups which serve as the substrate particles in the subsequent examples.

The latex of coating particles is formed by heating about 17 weight % polyvinylbenzyl chloride latex with about 1 weight % ethylene diamine to cross-link the latex. The cross-linked latex is then treated with dimethylethanol amine to form latex particles with active sites of the following formula:

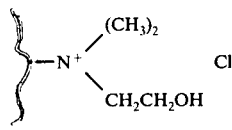

The latex is characterized by a median particle size of 0.376 microns and a solids content of 12%.

The foregoing latex is then sonicated for about 10 minutes to separate any particles that may have agglomerated. Then, this mixture is allowed to cool for about 5 minutes. Reagent grade sodium carbonate (0.19 grams) is added to 100 ml beaker to which 10 ml of the cooled latex is added and stirred using a magnetic stirrer.

The substrate particles are reduced to the desired size by grinding in a mortar and pestle to a fine powder of size range 45 to 53 microns and formed into a suspension in distilled water. The specific ion exchange resin employed is gel-type 2% surface sulfonated styrene-DVB copolymer containing about 2 weight % of DVB monomer. 3.3 grams of the substrate resin particles formed as above are mixed with 15 ml of triply distilled water and gently mixed to form a slurry.

The substrate particle slurry is added dropwise to the coating particle latex-sodium carbonate mixture close to the stirrer to provide maximum agitation of the substrate particles. Addition of substrate particles is terminated at the end point which is illustrated by clearing of the cloudy latex. It has been found that this occurs with the indicated quantity of 3.3 grams of resin. Thereafter, the agglomerated resin is permitted to settle and the excess water supernatant is drawn off from above the resin by a pipette. Then, the agglomerated resin slurry is eluted into the fixed volume loop of 20 ml and packed into the chromatographic separation column of 12 ml from the loop under 450 psi pressure. The separation column is of the type used with the Dionex Model 10 with a packed resin dimension of 2.8 mm i.d. and 500 mm long.

EXAMPLE 2

A chromatographic separation is performed in the foregoing packed column on a standard anion solution in distilled water including: 3 ppm $F^-$; 4 ppm $Cl^-$; 10 ppm $NO_2^-$; 50 ppm $PO_4^{-3}$; 10 ppm $Br^-$; 30 ppm $NO_3^-$; and 50 ppm $SO_4^{-2}$. 0.1 ml of the standard was loaded onto the column at the column head and passed through the column. Thereafter, 46 ml of eluent (0.003 M $NaHCO_3$ and 0.0024 M $Na_2CO_3$ in distilled water) is passed thourgh the column at a flow rate of 138 ml/hr.

The eluted sample is passed through the conductivity cell of the Dionex Model 10 with a meter setting of 30μMHO/cm. The chromatogram is illustrated in FIG. 3.

What is claimed is:

1. A method for forming a plurality of agglomerated ion exchange particles comprising the steps of
   (a) mixing soluble multivalent ions into an aqueous dispersion of finely divided coating particles formed of insoluble synthetic resin and having ion exchange sites with monovalent counterions on their surfaces, said multivalent ions being of the same charge as said monovalent counterions, to displace the monovalent counterions on said ion exchange sites with the multivalent ions and
   (b) directing a stream of synthetic resin substrate particles, having ion exchange sites which attract said coating particles ion exchange sites, into a volume of said aqueous dispersion and agitating the mixture to form agglomerates comprising a uniform layer of coating particles affixed to the surface of said substrate particles.

2. The method of claim 1 in which said monovalent counterions are negatively charged and said multivalent ions are selected from the group consisting of carbonate ion, phosphate ion, and mixtures thereof.

3. The method of claim 2 in which said multivalent ions comprise carbonate ions.

4. The method of claim 1 in which said multivalent ions are in stoichiometric excess of said monovalent counterions.

5. An aqueous dispersion of agglomerates formed by the process of claim 1.

6. A method for forming a packed column containing a bed of ion exchange particles suitable for performing an ion exchange separation comprising
   (a) mixing soluble multivalent ions in a mixing vessel with an aqueous dispersion of finely divided coating particles formed of insoluble synthetic resin and having ion exchange sites with monovalent counterions on their surfaces, said multivalent ions being of the same charge as said monovalent counterions, to displace the monovalent counterions on said ion exchange sites with the multivalent ions,
   (b) directing a stream of synthetic resin substrate particles, having ion exchange sites which attract said coating particles ion exchange sites into said aqueous dispersion and agitating the mixture to form a slurry of agglomerates comprising a uniform layer of coating particles affixed to the surface of said substrate particles, and
   (c) passing said agglomerate slurry from said mixing vessel into an ion exchange separation column.

7. The method of claim 6 in which said agglomerates are settled in step (b) and excess liquid is removed from said slurry prior to step (c).

8. The method of claim 6 in which step (c) is performed under pressure.

9. The method of claim 6 in which said monovalent counterions are negatively charged and said multivalent ions are selected from the group consisting of carbonate ion, phosphate ion, and mixtures thereof.

10. The method of claim 6 in which said multivalent ions comprise carbonate ions.

* * * * *